US00RE47911E

(19) United States
(12) Reissued Patent
Soomro et al.

(10) Patent Number: US RE47,911 E
(45) Date of Reissued Patent: *Mar. 17, 2020

(54) NOISE MARGIN INFORMATION FOR POWER CONTROL AND LINK ADAPTATION IN IEEE 802.11H WLAN

(71) Applicant: KONINKLIJKE PHILIPS N.V., Eindhoven (NL)

(72) Inventors: Amjad Ali Soomro, Hopewell Junction, NY (US); Sunghyun Choi, Seoul (KR)

(73) Assignee: KONINKLIJKE PHILIPS N.V., Eindhoven (NL)

( * ) Notice: This patent is subject to a terminal disclaimer.

(21) Appl. No.: 14/310,653

(22) Filed: Jun. 20, 2014

Related U.S. Patent Documents

Reissue of:
(64) Patent No.: 7,801,544
Issued: Sep. 21, 2010
Appl. No.: 10/167,178
Filed: Jun. 11, 2002

U.S. Applications:
(63) Continuation of application No. 13/623,989, filed on Sep. 21, 2012, now Pat. No. Re. 45,019, which is an application for the reissue of Pat. No. 7,801,544.
(Continued)

(51) Int. Cl.
*H04B 7/00* (2006.01)
*H04L 1/00* (2006.01)
(Continued)

(52) U.S. Cl.
CPC ..... *H04L 1/0026* (2013.01); *H04L 1/0028* (2013.01); *H04W 52/267* (2013.01);
(Continued)

(58) Field of Classification Search
CPC ..... H04B 2001/1054; H04L 1/02; H04L 1/20; H04L 1/26; H04L 1/28; H04W 84/12;
(Continued)

(56) References Cited

U.S. PATENT DOCUMENTS 3,732,496 A 5/1973 Boyer
4,495,648 A 1/1985 Giger
(Continued)

FOREIGN PATENT DOCUMENTS

JP 2000124914 A 4/2000
JP 2000278740 A 10/2000
(Continued)

OTHER PUBLICATIONS

Kolenchery et al: "Performance of Local Power Control in Peer-To-Eer Impusle Radio Networks with Bursty Traffic"; pp. 910-916.
(Continued)

*Primary Examiner* — Matthew E Heneghan

(57) ABSTRACT

A method and apparatus for adjusting the transmission power level or transmission data rate between a plurality of stations located within the coverage area of a basic service set (BSS) or in an independent basic service set (IBSS) in a wireless local area network (WLAN). The receiving station extracts a transmission data rate from an incoming signal, determines a signal-to-noise ratio (SNR) for the incoming signal, and then calculates noise margin information based on a difference between the SNR of the incoming signal and a minimum $SNR_{MIN}$ for the extracted data rate. The noise margin is then transmitted back to the original transmitting station and using the noise margin information, the transmit power level and/or the transmission rate of this station may be adjusted accordingly.

20 Claims, 3 Drawing Sheets

AMENDED

Related U.S. Application Data

(60) Provisional application No. 60/302,128, filed on Jun. 29, 2001.

(51) Int. Cl.

| | |
|---|---|
| ***H04W 52/26*** | (2009.01) |
| *H04W 52/24* | (2009.01) |
| *H04W 52/08* | (2009.01) |
| *H04W 84/12* | (2009.01) |

(52) U.S. Cl.
CPC ..... *H04L 1/0002* (2013.01); *H04W 52/08* (2013.01); *H04W 52/243* (2013.01); *H04W 84/12* (2013.01)

(58) Field of Classification Search
CPC .. H04W 52/08; H04W 52/243; H04W 52/267
USPC ..... 455/67.13, 69
See application file for complete search history.

(56) References Cited

U.S. PATENT DOCUMENTS

| | | | | |
|---|---|---|---|---|
| 4,723,303 | A | 2/1988 | Koch | |
| 4,777,653 | A | 10/1988 | Bonnerot et al. | |
| 4,811,421 | A | 3/1989 | Havel et al. | |
| 5,077,732 | A | 12/1991 | Fischer et al. | |
| 5,487,180 | A | 1/1996 | Ohtake | |
| 5,528,593 | A | 6/1996 | English et al. | |
| 5,590,409 | A | 12/1996 | Sawahashi et al. | |
| 5,603,096 | A | 2/1997 | Gilhousen et al. | |
| 5,732,328 | A | 3/1998 | Mitra et al. | |
| 5,771,461 | A | 6/1998 | Love et al. | |
| 5,815,798 | A | 9/1998 | Bhaglia et al. | |
| 5,822,318 | A | 10/1998 | Tiedemann, Jr. et al. | |
| 5,995,496 | A | 11/1999 | Honkasalo et al. | |
| 6,292,471 | B1 | 9/2001 | Cao et al. | |
| 6,418,327 | B1 * | 7/2002 | Carey et al. | H04W 16/06 455/422.1 |
| 6,505,035 | B2 * | 1/2003 | Ue | H04L 1/0002 455/67.13 |
| 6,798,735 | B1 * | 9/2004 | Tzannes et al. | 370/207 |
| 6,807,154 | B1 * | 10/2004 | Malmgren et al. | H04L 1/0001 370/252 |
| 6,961,545 | B2 * | 11/2005 | Tehrani | H04B 7/061 455/101 |
| RE45,019 | E * | 7/2014 | Soomro | 370/318 |

FOREIGN PATENT DOCUMENTS

| | | | |
|---|---|---|---|
| JP | 2001044932 | A | 2/2001 |
| KR | 20110026311 | A | 9/1999 |
| WO | 0004649 | A1 | 1/2000 |
| WO | 0077949 | A1 | 12/2000 |
| WO | 0101601 | A1 | 1/2001 |

OTHER PUBLICATIONS

Gupta et al: "The Capacity of Wireless Networks"; IEEE Transactions on Information Theory, vol. 46, No. 2, Mar. 2000, pp. 388-404.
IEEE 802/11h/D2.0, Mar. 2002 (Draft Supplement to IEEE Std 802/11, 1999 Edition, Telecommunications and Information Exchange Between Systems-Part 11:Wireless Medium Access Control (MAC)and Physical Layer (PHY) Specifications: Spectrum and Transmit Power Management Extensions in the 5GHz Band in Europe, 68 page Document.

* cited by examiner

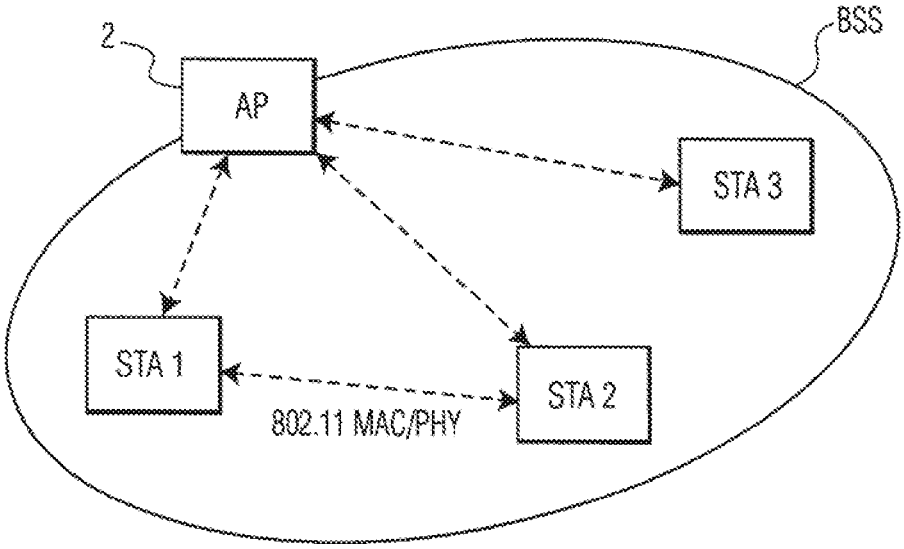
FIG. 1 AMENDED
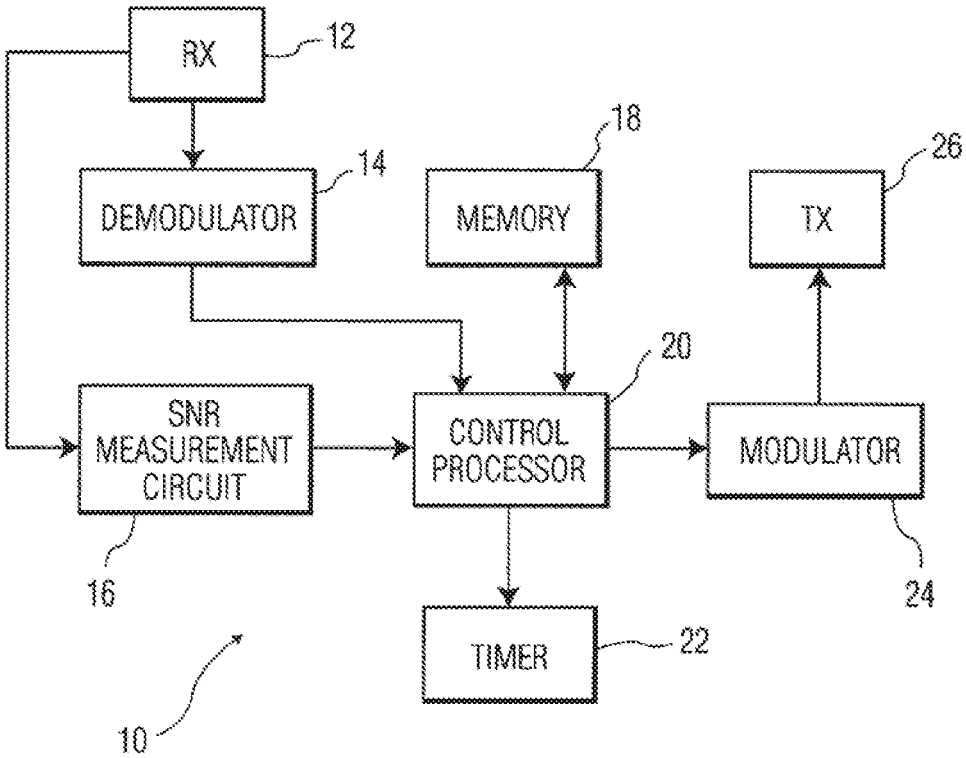
FIG. 2 AMENDED

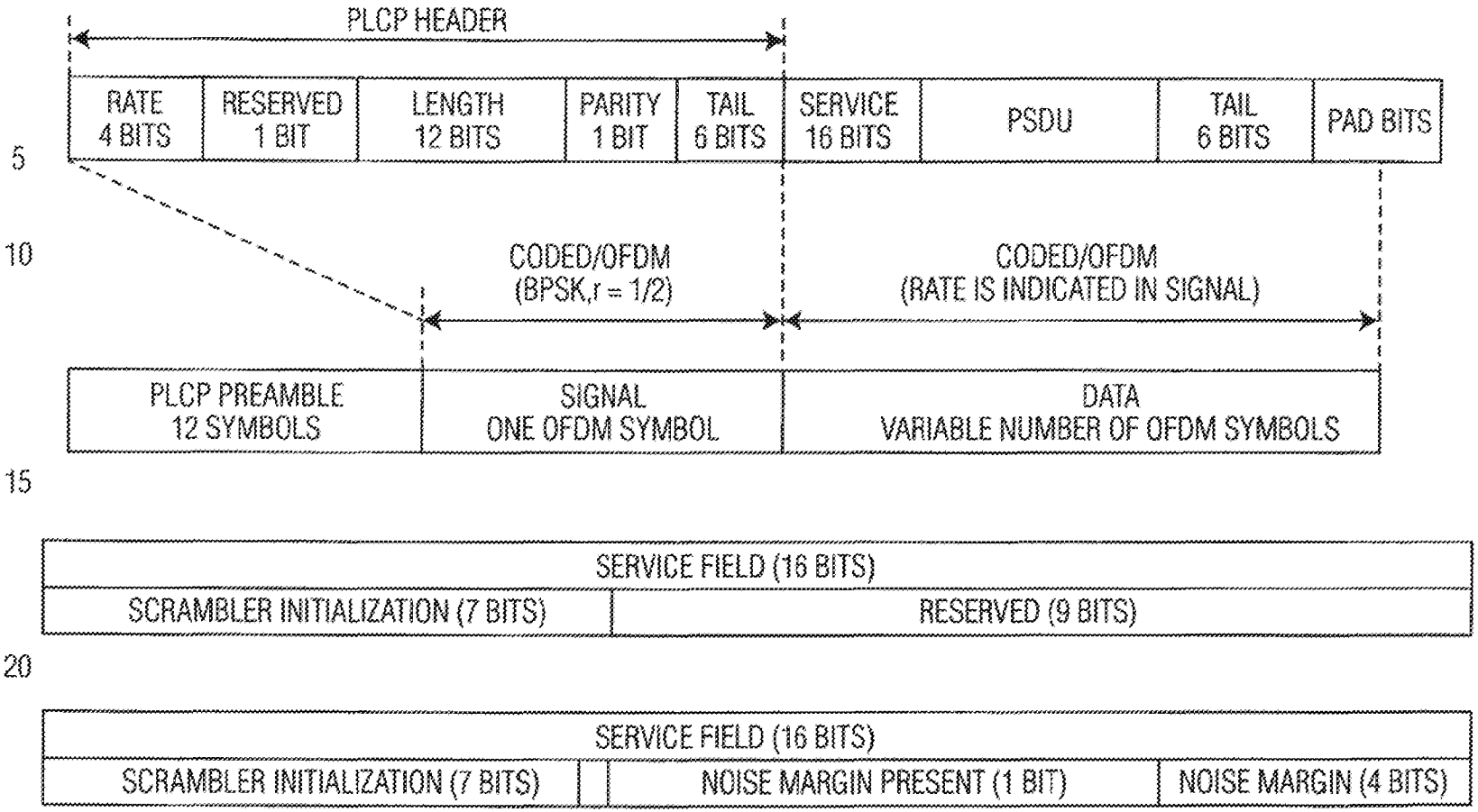
FIG. 3 AMENDED

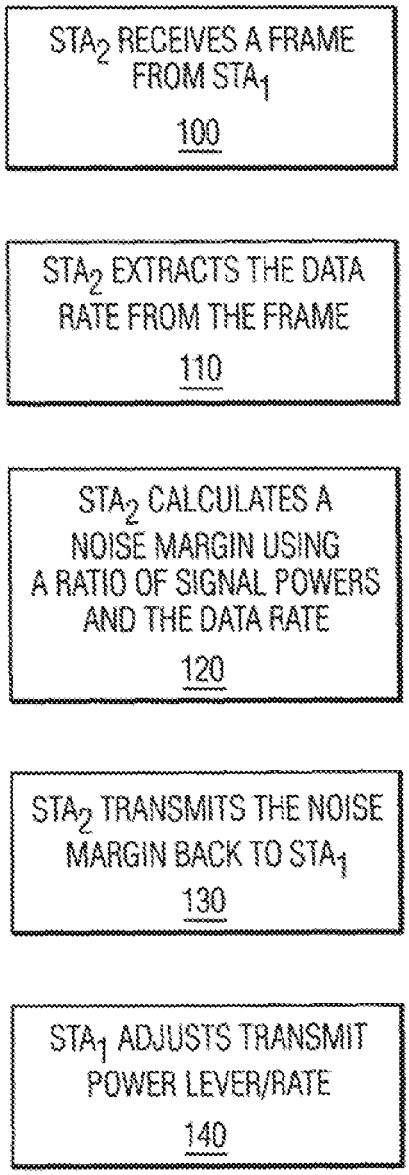
FIG. 4 AMENDED

NOISE MARGIN INFORMATION FOR POWER CONTROL AND LINK ADAPTATION IN IEEE 802.11H WLAN

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATION

This application claims the benefit *or priority of and describes the relationships between the following applications: wherein this application is an application for reissue of U.S. Pat. No. 7,801,544, which issued Sep. 21, 2010, and is also a continuation of U.S. patent application Ser. No. 13/623,989, filed Sep. 21, 2012, which is also an application for reissue of U.S. Pat. No. 7,801,544, from U.S. patent application Ser. No. 10/167,178, filed Jul. 11, 2002, which claims the priority* of U.S. Provisional Applications Ser. No. 60/320,128 filed Jun. 29, 2001, the teachings of *each of* which are incorporated herein by reference.

FIELD OF THE INVENTION

The present invention relates to communication systems. More particularly, the present invention relates to a system and method for providing information to the transmitting wireless stations in an IEEE 802.11 wireless local area network (WLAN) regarding the receiving wireless station's receiver capabilities.

BACKGROUND OF THE INVENTION

In general, there are two variants of wireless local area networks (WLAN): infrastructure-based and ad hoc-type. In the former network, communication typically takes place only between the wireless nodes, called stations ($STA_i$), and the access point (AP), whereas communication takes place between the wireless nodes in the latter network. The stations and the AP, which are within the same radio coverage, are known as a basic service set (BSS).

The IEEE 802.11 standard specifies the medium access control (MAC) and physical layer (PHY) characteristics for a wireless local area network (WLAN). The IEEE 802.11 standard is defined in International Standard ISO/IEC 8802-11, "Information Technology—Telecommunications and information exchange area networks", 1999 Edition, which is hereby incorporated by reference in its entirety.

Currently, the IEEE 802.11 does not provide a mechanism to enable dynamic transmit power control between wireless stations within a BSS. Typically, each 802.11 STA uses a fixed transmission power level for all the frame transmissions throughout its lifetime. Accordingly, there is a need for a transmit power level and transmission rate adjustment mechanism that can be implemented within the proposed 802.11a PHY/802.11h MAC implementation without much complexity.

SUMMARY OF THE INVENTION

The present invention is directed to a system and method of estimating receiver capability information by a receiving station, and conveying this information back to the transmitting station. The transmitting station is thereby enabled to determine accurately the transmission power level or to adjust transmission rate in a wireless local area network (WLAN) for future data transmissions to the receiving station. Receiver capability information, hereinafter known as "Noise Margin", is the receiving wireless station's receiver capabilities, including the local noise/interference level, the channel path loss and the channel conditions. Generally, the noise margin is the ratio of the received signal power to that required for effective communication.

According to one illustrative embodiment of the present invention, a method for determining the transmission power level and/or transmission rate between a plurality of stations located within the coverage area of a basic service set (BSS) in a wireless local area network (WLAN) is provided. The method includes the steps of: extracting the data rate of a transmission from an incoming frame; calculating the signal-to-noise ratio (SNR) of the received frame; calculating the noise margin for the extracted data rate based on the difference of the SNR and the minimum acceptable SNR ($SNR_{MIN}$); transmitting the noise margin information to the transmitting station and adjusting the transmit power level or the transmission rate for future data transmitted by the transmission station and/or other stations in the BSS according to the received calculated noise margin.

The present invention also provides an apparatus with a power measurement circuit for determining the received power level between a plurality of stations located within the coverage area of a basic service set (BSS) in a wireless local area network (WLAN). The apparatus includes a receiver circuit for demodulating an incoming signal; an SNR measurement circuit for measuring the received SNR of the incoming signal received therein; a processor, coupled to the power measurement circuit, for calculating noise margin based on the difference of the SNR and the minimum acceptable SNR ratio for the extracted data rate; a memory, coupled to the processor, for storing the calculated noise margin information for a predetermined time period for a subsequent retrieval; and, a transmitter circuit coupled to the processor The foregoing and other features and advantages of the invention will be apparent from the following, more detailed description of preferred embodiments as illustrated in the accompanying drawings in which reference characters refer to the same parts throughout the various views.

BRIEF DESCRIPTION OF THE DRAWINGS

FIG. 1 is a simplified block diagram illustrating the architecture of a wireless communication system whereto embodiments of the present invention are to be applied;

FIG. 2 illustrates a simplified block diagram of an access point and each station within a particular basic service set (BSS) according to the embodiment of the present invention;

FIG. 3 illustrates the format of an 802.11 frame, including the modification of the SERVICE field, that can be used to transmit information between stations according to an embodiment of the present invention; and FIG. 4 is a flow chart illustrating the operation steps of selectively adjusting the power level according to an embodiment of the present invention

DETAILED DESCRIPTION OF THE EMBODIMENTS

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments that depart from these specific details.

FIG. 1 illustrates a representative network whereto embodiments of the present invention are to be applied. As shown in FIG. 1, an access point (AP) 2 is coupled to a plurality of mobile stations ($STA_i$), which, through a wireless link, are communicating with each other and to the AP via a plurality of wireless channels. A key principle of the present invention is to provide a mechanism to enable a transmitting station to gain knowledge regarding the receiving stations' local noise/interference, channel path loss and its performance capability. This is accomplished by the receiving station estimating the noise margin, for example, at the time and for the rate at which a frame is received, and conveying this information back to the transmitting station). As noted above, the noise margin is the ratio of the received signal power to that required for a particular level or threshold of communication, (hereinafter known as effective or reliable communication between the stations), the level is based on a number of factors effecting communication, such as error rates, SNRs, as well as any other conventional measure of transmission performance. The noise margin is useful in, but not limited to, minimizing the transmitter power or other types of power control such as saving the battery power, avoiding interference to other systems, adjusting radio coverage and adjusting transmission rate, by transmitting frames at just the right power level and the right transmission rate. IEEE 802.11 Physical Layers (PHYs) define a plurality of transmission rates based different modulations and channel coding schemes so that the transmitter of a frame can choose one of the multiple rates based on the wireless channel condition between the receiver and itself at a particular time. Typically, the lower the transmission rate, the more reliable the transmission. It should be noted that the network shown in FIG. 1 is small for purposes of illustration. In practice most networks would include a much larger number of mobile stations.

The AP and each STA within the WLAN of FIG. 1 may include a system with an architecture that is illustrated in the block diagram of FIG. 2. Referring to FIG. 2, both the AP and STA may include a receiver 12, a demodulator 14, a SNR measurement circuit 16, a memory 18, a control processor 20, a timer 22, a modulator 24, and a transmitter 26. The exemplary system 10 of FIG. 2 is for descriptive purposes only. Although the description may refer to terms commonly used in describing particular mobile stations, the description and concepts equally apply to other processing systems, including systems having architectures dissimilar to that shown in FIG. 2.

In operation, the receiver 12 and the transmitter 26 are coupled to an antenna (not shown) to convert received signals and transmit desired data into corresponding digital data via the demodulator 14 and the modulator 24, respectively. The SNR measurement circuit 16 operates under the control of the processor 20 to determine the SNR, or similar calculation to estimate noise margin, of a received frame. Processor 20 thereafter calculates the noise margin based on the difference of the SNR (in dB) and the minimum acceptable SNR ($SNR_{MIN}$) for a particular data rate. The minimum acceptable SNR for a particular data rate is determined by any of a number of methods (e.g., an error rate threshold may be used or the receiver may be configured with modulation error estimate parameters). For example, 'noise margin' calculated in an 802.11 compliant STA for a received PPDU may be calculated as the additional noise/interference in the PPDU in dB that could be tolerated by this STA without affecting its correct reception. As an example, if a receiver determines that a received PPDU had a signal-to-noise ratio (SNR) of 30 dB and it was transmitted at 24 Mbps rate, then if the receiver could correctly receive the same PPDU at 24 Mbps with signal-to-noise ratio of 24 dB ($SNR_{MIN}$), then it would report a noise margin of 6 dB. The noise margin is stored in the memory 18 that is coupled to the processor 20 for subsequent retrieval. The timer 22 is used to eliminate the outdated noise margin information, which is stored in the memory 18. In the embodiment, the noise margin is updated as it may change due to the varying nature of the wireless channel as well as the potential mobility of WLAN STAs.

FIG. 3 represents the format of PHY Protocol Data Unit (PPDU) frame that is used to convey the noise margin information between the stations. As shown in the lowest part of FIG. 3, the noise margin information (represented by noise margin Present and noise margin) is transmitted in the SERVICE field of the 802.11a/h PPDU frame. The SERVICE field of the 802.11a is slightly modified to include the one-bit noise margin Present field and four-bit noise margin field. The original SERVICE field 30 format of the PLCP Header 28 of 802.11a is found in the middle part of FIG. 3. The one-bit noise margin Present field 32 is defined as 0 or 1, where the noise margin field 34 may be optional in a system and presence of the noise margin information is indicated by setting the 'Noise Margin Present' bit. Otherwise, the 'Noise margin Present' bit is set to zero. The noise margin field 34 is defined from 1 to 16, where each value is in decibels (dB), for example, −6 dB to +10 dB, and the field value would be based on calculations on immediate prior frame transmitted from the current destination STA. In addition, the RXVECTOR and TXVECTOR fields, which are passed between MAC and are modified to add noise margin information. In particular, one parameter, NOISE MARGIN, is extracted from or inserted into the SERVICE field 30 in the PPDU. The most significant bit of the currently reserved bits would be set if a valid value in present in the remaining seven bits. Else, it would be reset with a '0' value. As those skilled in the art will recognize the noise margin information could be sent by other means, for example, in the MAC payload, as well as other portions of the header.

The noise margin field 34 transmitted in a current PPDU would correspond with the noise margin measurements on the immediately prior frame received from the STA that is the current PPDU's destination STA. The noise margin information is transmitted back to the transmitting station and now this station based on the received noise margin of the receiver adjusts the transmission power or the transmission rate. It is noted, however, that a receiver may transmit any noise margin value it may deem appropriate to indicate to the transmitter its performance capability, presence of local interference or desire for power adjustment. After obtaining the noise margin by receiving frame(s), the receiving STA can determine both the PHY rates as well as the transmission power intelligently for its future transmission to that STA. Thus, the transmission power level and rate are determined solely up to the transmitting STA's discretion.

Now, the principle of operation steps according to the present invention of determining the noise margin to determine the transmission power level/transmission rate is explained hereafter.

Referring to FIG. 4, the inventive process includes the following steps: in step 100, a station STA2 receives a frame from a transmitting station STA1. In step 110, the STA2 extracts the data rate from the received frame. In step 120, the STA2 calculates the noise margin, which is the difference between the received SNR and the $SNR_{MIN}$. The noise margin information is transmitted to STA1 in step 130. The noise margin is then used to determine the transmitter power required to obtain the desired carrier-to-noise ratio within the transmitting station and the receiver in BSS. In step 140, the STA1 adjusts the transmission power level and/or the transmission rate based on the adjustment level that was determined in step 120.

Although a limited number of STAs is shown in FIG. 1 for illustrative purposes, it is to be understood that the WLAN can support communications between a much larger number of STAs. Thus, the number of STAs in the figure should not impose limitations on the scope of the invention. In such event, each STA keeps track of the noise margin between other STAs within the BSS and to the AP, then each transmitting station may use the noise margin to adjust the transmit power level as it transmits a frame to another STA or to the AP. With non-802.11e WLAN, a STA needs to keep track of the noise margin with the AP only as the STA must transmit frames to its AP. Here, each transmitting station may want to keep track of the noise margin with a selected number of STAs to reduce the complexity. In addition, to prevent using outdated and stale noise margin information, the present invention may adopt the noise margin information lifetime. To this end, whenever STA 2 updates the noise margin with STA 1 by receiving a frame from STA 1, STA 2 sets a timer for each updated noise margin information using the timer 22 of FIG. 2. Hence, the STA 2 will compare the most recent updated time of the frame with the current time when it is to transmit a frame.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from the central scope. Therefore, it is intended that the present invention not be limited to the particular embodiment disclosed as the best mode contemplated for carrying out the present invention, but that the present invention include all embodiments falling within the scope of the appended claims.

What is claimed is:

[1. A method for transmitting data among stations in a wireless local area network (WLAN), comprising:

determining, at a receiving station, a measure of received signal power of a signal received from a transmitting station;

calculating by the receiving station a noise margin based on a difference between the measure of received signal power and a power measure required for reliable communication at a predetermined data rate of the signal; and transmitting the noise margin from the receiving station to the transmitting station.]

[2. The method of claim 1, further including:

receiving the noise margin at the transmitting station, and adjusting at least one of a transmit power level and a transmission rate of the transmitting station based on the noise margin.]

[3. The method of claim 1, wherein:

determining the measure of received signal power includes determining a signal-to-noise ratio (SNR) of the received frame; and calculating the noise margin includes determining a difference between the SNR and a minimum acceptable signal-to-noise ratio ($SNR_{MIN}$).]

[4. The method of claim 1, further comprising storing said noise margin in a memory medium at the receiver.]

[5. The method of claim 1, wherein the transmitting station is located within a basic service set (BSS) or an independent basic service set (IBSS).]

[6. The method of claim 1, wherein the receiving station is a mobile unit located within a basic service set (BSS) or an independent basic service set (IBSS).]

[7. A method for transmitting data among a plurality of stations located within the coverage area of a basic service set (BSS) in a wireless local area network (WLAN) comprising:

transmitting a first frame from a transmitting station;

receiving the first frame at the receiving station;

determining, at the receiving station, a transmission data rate of the first frame;

calculating, by the receiving station, a signal-to-noise ratio (SNR) of the first frame;

calculating, by the receiving station, a noise margin based on a difference between the SNR and a minimum acceptable signal-to-noise ratio ($SNR_{MIN}$) for the data rate;

transmitting the noise margin from the receiving station;

receiving the noise margin at the transmitting station;

calculating, by the transmitting station, at least one of a new transmit power level and new transmission data rate based on the noise margin; and, adjusting, at the transmitting station, at least one of a transmit power level and the transmission data rate to the at least one of a new transmit power level and a new transmission data rate.]

[8. The method of claim 7, further comprising:

transmitting, by the receiving station, a second noise margin to a second station and adjusting at least one of a transmission power level and a transmission rate of the second station based on the second noise margin.]

[9. The method of claim 7, wherein the receiving station or the transmitting station are mobile units.]

[10. An apparatus for determining the transmission power level between a plurality of non access point stations located within the coverage area of a basic service set (BSS) in a wireless local area network (WLAN), comprising:

means for receiving an incoming signal from a first station;

means for demodulating said incoming signal;

means for determining a transmission data rate and a measure of received signal power of the incoming signal;

means for calculating a noise margin based on a difference between the measure of received signal power and a power measure required for a predetermined threshold of communication for the transmission data rate;

means for transmitting said noise margin to the said first station, and, means for storing said noise margin for a subsequent retrieval.]

[11. The apparatus of claim 10, further comprising means for adjusting at least one of a transmit power level and a transmission rate of the apparatus, in response to said noise margin.]

[12. The apparatus of claim 10, further comprising means for modulating signals indicative of said noise margin.]

[13. The apparatus of claim 10, wherein the noise margin is stored for a predetermined time period.]

[14. The apparatus of claim 10, wherein said signal is transmitted by a transmitting station located within a basic service set (BSS) or an independent basic service set (IBSS).]

[15. The method of claim 1, wherein the transmitting station is an access point (AP) located with a basic service set (BSS).]

[16. The method of claim 1, wherein the receiving station is an access point (AP) located with a basic service set (BSS).]

[17. The apparatus of claim 10, wherein the first station is an access point (AP) located with a basic service set (BSS).]

[18. An apparatus comprising:

a transmitter that is configured to transmit a signal at a transmit power level and a transmit data rate, a receiver that is configured to receive a noise margin corresponding to receipt of the signal at a receiving station, wherein the noise margin is based on a difference between a measure of received signal power and a power measure required for reliable communication at a predetermined data rate of the signal, and a processor that is configured to calculate an adjustment to at least one of the transmit power level and transmit data rate based on the noise margin, and to correspondingly adjust the at least one transmit power level and transmit data rate.]

[19. The apparatus of claim 18, wherein the apparatus is a mobile station.]

[20. The apparatus of claim 18, wherein the apparatus is an access point (AP) located with a basic service set (BSS).]

*21. A system for transmitting data among wireless stations in a wireless local area network (WLAN), the system comprising:*

*a wireless transmitting station and a wireless receiving station, the wireless transmitting station comprising:*

*a transmitter that is configured to transmit a signal at a transmit power level and a transmit data rate to the wireless receiving station;*

*a receiver that is configured to receive a noise margin corresponding to receipt of the signal at the receiving station;*

*the wireless receiving station comprising a receiving processor configured to calculate the noise margin based on a difference between a measure of a received signal power of the transmitted signal received by the wireless receiving station from the wireless transmitting station and a power measure required for a predetermined threshold of communication that corresponds to the transmitted data rate, the receiving processor being further configured to forward the noise margin to the wireless transmitting station,*

*the wireless transmitting station further comprising a memory and a transmitting processor coupled to and configured by the memory to calculate an adjustment to at least one of the transmit power level and transmit data rate based on the received noise margin, and to correspondingly adjust the at least one transmit power level and transmit data rate for a subsequent transmission to the wireless receiving station.*

*22. The system of claim 21, wherein the transmitter, receiver, memory and processor are contained within a mobile station.*

*23. The system of claim 21, wherein the wireless transmitting and receiving stations are configured to operate within a basic service set (BSS).*

*24. A method for transmitting data among stations in a wireless local area network (WLAN), the method comprising acts of:*

*transmitting from a wireless transmitting station a signal at a transmit power level and a transmit data rate to a wireless receiving station;*

*receiving from the wireless receiving station a noise margin corresponding to receipt of the signal at the wireless receiving station;*

*wherein the noise margin is calculated by the wireless receiving station based on a difference between a measure of received signal power and a power measure required for a predetermined threshold of communication that corresponds to the transmitted data rate;*

*calculating by the wireless transmitting station an adjustment to at least one of the transmit power level and transmit data rate based on the received noise margin; and*

*adjusting the at least one transmit power level and transmit data rate for a subsequent transmission to the receiving station based on the calculated adjustment.*

*25. A method for transmitting data among stations in a wireless local area network (WLAN), the method comprising acts of:*

*a wireless receiving station determining a measure of received signal power of a signal having a transmit data rate received from a wireless transmitting station;*

*a processor of the wireless receiving station extracting the transmit data rate from the signal and calculating a noise margin based on a ratio of the received signal power to a minimum power measure that corresponds to the transmit data rate;*

*a transmitter of the wireless receiving station transmitting the calculated noise margin to the wireless transmitting station;*

*the processor of the wireless receiving station receiving a transmitting station noise margin; and*

*adjusting at least one of a transmit power level and a transmission rate of the wireless receiving station based on the received transmitting station noise margin.*

*26. The method of claim 25, further comprising acts of:*

*receiving the calculated noise margin at the wireless transmitting station; and*

*adjusting at least one of a transmit power level and a transmission rate of the wireless transmitting station based on the received noise margin.*

*27. The method of claim 25, wherein determining the measure of received signal power comprises acts of:*

*determining a signal-to-noise ratio (SNR) of the received signal; and*

*calculating the noise margin including determining a difference between the SNR and a minimum acceptable signal-to-noise ratio that corresponds to the transmit data rate.*

*28. The method of claim 25, further comprising an act of storing the received transmitting station noise margin in a memory at the wireless receiving station.*

*29. The method of claim 25, further comprising an act of storing the measure of received signal power in a memory at the wireless receiving station.*

*30. The method of claim 25, wherein the transmitting station is located within a basic service set (BSS) which is one of an infrastructural BSS and an independent basic service set (IBSS).*

*31. The method of claim 25, wherein the wireless receiving station is a mobile unit located within a basic service set (BSS) which is one of an infrastructural BSS and an independent basic service set (IBSS).*

*32. A wireless apparatus for transmitting data among wireless stations in a wireless local area network (WLAN), the wireless apparatus comprising:*

*a transmitter that is configured to transmit a signal at a transmit power level and a transmit data rate to a wireless receiving station;*

*a receiver that is configured to receive a noise margin from the wireless receiving station corresponding to the signal received at the wireless receiving station; and*

*a memory and a processor coupled to and configured by the memory to calculate a noise margin from a received signal having a transmission data rate based on a ratio of a received signal power to a minimum power measure that corresponds to the transmission data rate, the processor being further configured to calculate an adjustment to at least one of the transmit power level and transmit data rate based on the received noise margin, and to correspondingly adjust the at least one transmit power level and transmit data rate for a subsequent transmission to the wireless receiving station.*

*33. The wireless apparatus of claim 32, wherein the transmitter, receiver, memory and processor are contained within a mobile station.*

*34. The wireless apparatus of claim 32, wherein the apparatus is configured to operate within a basic service set (BSS).*

*35. A wireless station in a wireless local area network (WLAN), the wireless station comprising:*

*a transmitter;*

*a receiver;*

*a memory; and*

*a processor coupled to the memory, transmitter and the receiver, the processor being configured by the memory to*

*determine a measure of received signal power of a signal having a transmission data rate that is received by the receiver from a wireless transmitting station;*

*calculate a noise margin based on a ratio of the received signal power to a minimum power measure that corresponds to the transmission data rate; and*

*control the transmitter to transmit the noise margin to the wireless transmitting station.*

*36. The wireless station of claim 35, wherein the noise margin is a first noise margin, wherein the receiver is configured to receive a second noise margin from a wireless receiving station, and wherein the processor is configured to adjust at least one of a transmit power level and a transmission rate for a subsequent transmission to the wireless receiving station based on the received second noise margin.*

*37. The wireless station of claim 35, further comprising a signal-to-noise measurement circuit configured to determine a signal-to-noise ratio (SNR) of the received signal, wherein the processor is configured to determine a difference between the SNR and a minimum acceptable signal-to-noise ratio that corresponds to the transmission data rate.*

*38. The wireless station of claim 35, wherein the processor is configured to store the noise margin in the memory.*

*39. The wireless station of claim 35, wherein the processor is configured to store the measure of received signal power in the memory.*

*40. The wireless station of claim 35, wherein the wireless station is configured to operate within a basic service set (BSS) which is one of an infrastructural BSS and an independent basic service set (IBSS).*

* * * * *